guide-eyes 48, depending from the intermediate bearing-strip 14, and from the latter this portion of the rope or cable runs to the gripping device located on the oposite side of the machine, and then returns through the lowermost set of brackets 6 on the jaws 5 and against the pulleys or sheaves 7 therein, and then to the gripping device at the opposite side, and from the latter under the frame of the machine to the rear extremity of the spool or reel 17, and passed around the latter in a direction opposite to the other extremity heretofore referred to and secured. By arranging the rope or cable in the manner described an equal tension or pulling strain can be equally exerted at opposite sides of the machine, and in primarily arranging the parts of the machine for first drawing the wires together the operation is as follows: The shaft 19 is shifted to the rear and held by means heretofore explained, thus throwing the gear 23 out of mesh with the gears 35 on the heads 34 and connecting the shaft through the clutch mechanism explained with the spool or reel 17. The clamping or gripping devices are connected to the wire at opposite sides, and the operator firmly grasping the grip 33 and turning the crank-handle 32 will actuate the spool or reel 17, and thereby gradually wind the extremities of the rope or cable 46 in opposite directions on the spool or reel from the opposite ends of the latter toward the center. This will shorten the rope or cable and cause the opposite gripping devices to move equally toward the sides of the machine, and backward movement or slipping of the spool or reel 17 will be prevented by means of the ratchet-teeth 21 and the pawl 22, heretofore set forth. When the wire ends have been taken up or drawn together a sufficient distance, they are arranged in the opposite twisting-heads and connected to the holding devices on the latter in the manner heretofore specified. It will be observed that the tension of the wire on the opposite sides will not be exerted on the twisting-heads in view of the fact that the gripping devices on the opposite sides of the machine will be held in their adjusted positions by virtue of the locked condition of the spool or reel 17, and after the wire ends have been disposed as explained the shaft 19 is shifted forwardly to throw the gear 23 in mesh with the gears 35 and at the same time unlock the spool or reel 17 from operative connection with the shaft. The shaft will now be free to turn in the spool or reel 17, and by again so operating it the twisting-heads will be rotated in opposite directions and the locking-twist formed between the contiguous wire ends. After completion of the jointure of the wire ends the spliced wire can be quickly removed from the machine or the latter withdrawn, as heretofore explained.

To suit different operations, it is proposed to change the form, size, proportions, and minor details without departing from the principle of the invention.

Having thus described the invention, what is claimed as new is—

1. In a wire stretching and splicing machine, the combination of a frame having opposite pairs of jaws at the extremities of the same, the lower jaw of each pair being removable, twisting-heads having hubs removably and rotatably held between the said jaws, and means for operating the said twisting-heads.

2. In a machine of the character set forth, the combination of a frame having opposite pairs of jaws, twisting-heads rotatably mounted between the said jaws and having radial slots to aline with open spaces between the jaws, and vertically-disposed freely-movable closing-pins extending downwardly through the upper jaw of each series to prevent accidental disengagement of the wire from the twisting-heads, said pins having spring-actuated operating-levers attached thereto.

In testimony that I claim the foregoing as my own I have hereto affixed my signature in the presence of two witnesses.

HENRY JACOBS.

Witnesses:
 GEO. M. BROWN,
 T. F. TRIMMER.

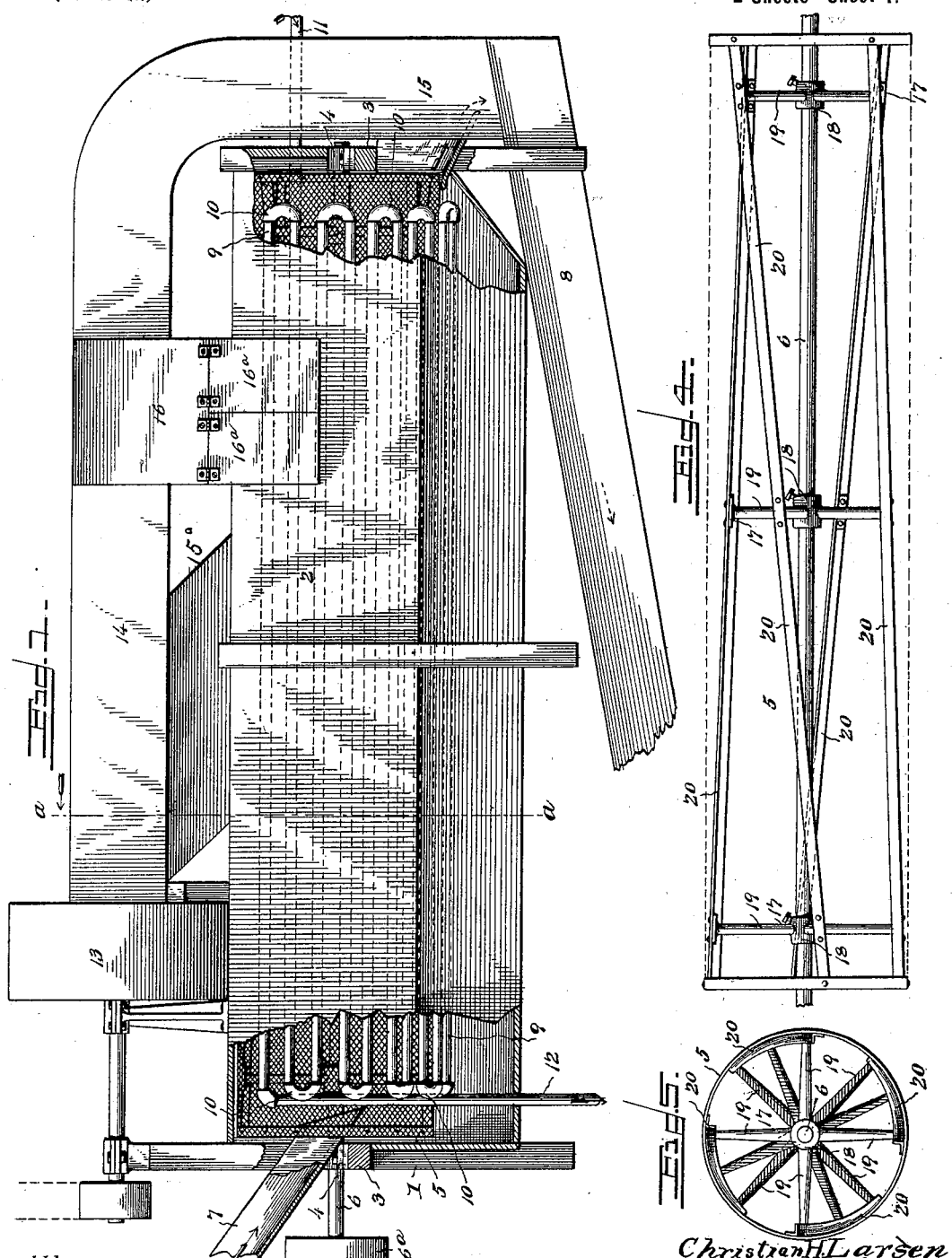

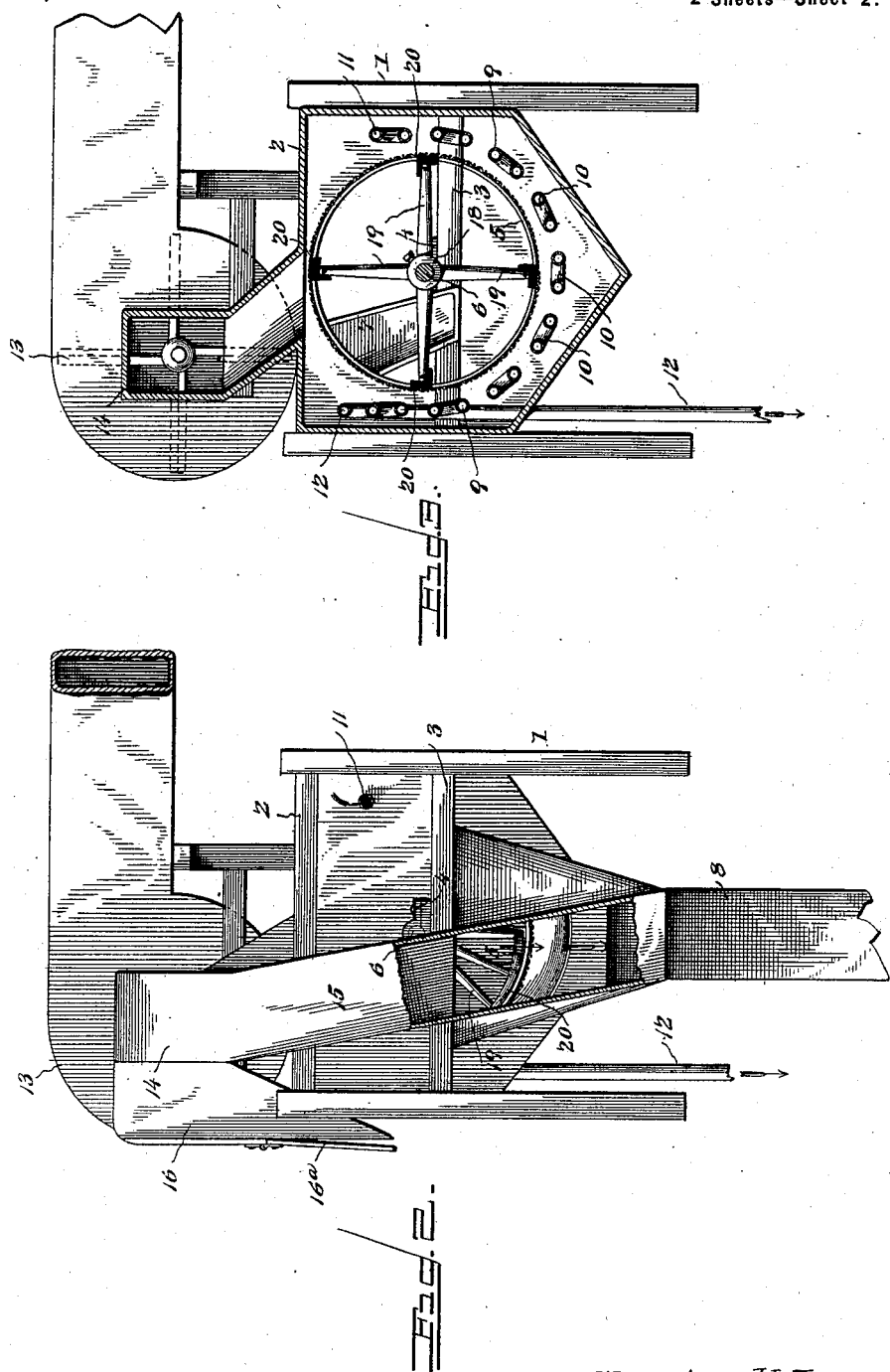

UNITED STATES PATENT OFFICE.

CHRISTIAN H. LARSEN, OF FOWLER, INDIANA.

GRAIN DRIER AND CLEANER.

SPECIFICATION forming part of Letters Patent No. 658,151, dated September 18, 1900.

Application filed January 27, 1898. Serial No. 668,203. (No model.)

*To all whom it may concern:*

Be it known that I, CHRISTIAN H. LARSEN, a citizen of the United States, residing at Fowler, in the county of Benton and State of Indiana, have invented a new and useful Grain Drier and Cleaner, of which the following is a specification.

My invention relates to improvements in grain driers and cleaners; and the object that I have in view is to provide a machine which will thoroughly aerate and dry the grain and at the same time cleanse the grain from dirt and other impurities.

It is well known that grain when stored in bins is liable to become moldy and sour owing to absorption of moisture during damp and foggy weather, and that when grain is handled or shipped in this moist condition it causes dirt and refuse to adhere thereto.

My invention is designed to afford a machine for aerating the grain to overcome these objections; and a further object that I have in view is to provide a simple, strong, and durable construction of screen conveyer which insures thorough agitation to the grain, permits of the circulation of hot air therethrough, and of the removal of dirt and other refuse which may adhere to the grain.

With these ends in view my invention consists in the novel combination of elements and in the construction and arrangement of parts, which will be hereinafter described and claimed.

To enable others to understand my invention, I have illustrated the preferred embodiment thereof in the accompanying drawings, forming a part of this specification, and in which—

Figure 1 is a sectional elevation of a grain drier and cleaner constructed in accordance with my invention. Fig. 2 is an end view, partly in section, looking at the delivery end of the machine. Fig. 3 is a vertical transverse sectional view on the plane indicated by the dotted line $a\ a$ of Fig. 1. Fig. 4 is a detail view of the skeleton frame forming a part of the revolving cylinder and screen. Fig. 5 is an end elevation of the revoluble screen.

Like numerals of reference denote like and corresponding parts in each of the several figures of the drawings.

In carrying my invention into practice I provide a substantial framework 1, to which is attached the panels forming with said framework the casing 2 of the machine. The framework has the cross-rails 3 at opposite ends thereof, and on said cross-rails are secured the alined journal-bearings 4. Within the casing is arranged the longitudinal screen-cylinder 5, the shaft 6 of which is journaled in the bearings 4, and one end of the shaft is extended or projected beyond the casing a suitable distance to receive a pulley $6^a$ for the purpose of positively rotating the screen-cylinder within the casing. The ends of the casing and the longitudinal screen-cylinder therein are open or exposed, and to one end of this screen-cylinder is fitted a feed spout or chute 7 of any suitable construction and arranged to deliver the grain to be treated directly into the head end of said screen-cylinder. The grain from the storage-bins may be conveyed by any suitable means to this inclined feeding chute or spout, and from the opposite delivery end of said screen-cylinder extends the inclined return-chute 8, upon which the grain, after having been treated in the cylinder, is deposited for the purpose of returning the grain to the storage-bins or to any other desired place.

Within the casing 2 is arranged the plurality of the heating-pipes 9. These heating-pipes are situated in close relation to the revoluble screen-cylinder, and in practice I prefer to arrange said heating-pipes around the sides of the screen-cylinder about four inches therefrom. The heating-pipes extend practically the full length of the casing and cylinder, and said heating-pipes are connected in series with each other by the employment of the return-bends 10, which are suitably attached to said heating-pipes to provide for the continuous circulation of steam or hot air through the entire series of pipes. I prefer to use steam as the medium for heating the pipes 9, and to this end an inlet-pipe 11 is connected to one end of the steam or heating pipes, while an outlet-pipe 12 is attached to the remote or distant end of the last pipe of the series of heating-pipes. I employ a large number of these heating-pipes to extend the full length of the casing and screen-cylinder for the purpose of heating the chamber suffi-